(12) United States Patent
Akhriev et al.

(10) Patent No.: US 10,353,093 B2
(45) Date of Patent: Jul. 16, 2019

(54) MULTI-SCALE MANIFOLD LEARNING FOR FULL WAVEFORM INVERSION

(71) Applicant: INTERNATIONAL BUSINESS MACHINES CORPORATION, Armonk, NY (US)

(72) Inventors: Albert Akhriev, Mulhuddart (IE); Sean McKenna, Blanchardstown (IE); Stephen Moore, Melbourne (AU); Sergiy Zhuk, Clonee (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 158 days.

(21) Appl. No.: 15/661,217

(22) Filed: Jul. 27, 2017

(65) Prior Publication Data
US 2019/0033478 A1    Jan. 31, 2019

(51) Int. Cl.
*G06F 11/30* (2006.01)
*G01V 1/30* (2006.01)
*G01V 1/28* (2006.01)

(52) U.S. Cl.
CPC .............. *G01V 1/305* (2013.01); *G01V 1/282* (2013.01); *G01V 2210/6222* (2013.01); *G01V 2210/679* (2013.01)

(58) Field of Classification Search
CPC ..................................................... G01V 1/303
See application file for complete search history.

(56) References Cited

U.S. PATENT DOCUMENTS

| 8,527,231 B2 | 9/2013 | Luce |
| 9,075,159 B2 | 7/2015 | Washbourne et al. |
| 9,176,930 B2 | 11/2015 | Lee et al. |

(Continued)

FOREIGN PATENT DOCUMENTS

WO    WO 2011/160201    12/2011

OTHER PUBLICATIONS

Aravkin, A., Friedlander, M. P., Herrmann, F. J. et al. (2012). Robust inversion, dimensionality reduction, and randomized sampling. Mathematical Programming, 134(1), 101-125.

(Continued)

*Primary Examiner* — Phuong Huynh
(74) *Attorney, Agent, or Firm* — F. Chau & Associates, LLC

(57) ABSTRACT

A method for analyzing acoustic/elastic waves to determine subsurface structure of the earth includes receiving a plurality of observations of a seismic acoustic/elastic wave-field from a plurality of sensors; generating a plurality of Bernstein grids of differing resolutions; calculating a data misfit of the plurality of observations with respect to an initial subsurface structure model defined in terms of conic combinations of Bernstein polynomials on a lowest resolution Bernstein grid, and mapping the data misfit from the Bernstein grid onto a Lagrangian grid; updating the subsurface structure model by minimizing the data misfit between the plurality of observations and observations obtained by a simulation; increasing resolution of the Bernstein grid and recomputing the updated subsurface structure model on the increased resolution Bernstein grid; and mapping the recomputed subsurface structure model onto the Lagrangian grid.

12 Claims, 9 Drawing Sheets

(56) References Cited

U.S. PATENT DOCUMENTS

| | | |
|---|---|---|
| 2005/0203982 A1 | 9/2005 | Kolibal |
| 2009/0213144 A1 | 8/2009 | Dokken et al. |
| 2010/0142316 A1 | 6/2010 | Keers et al. |
| 2013/0322209 A1 | 12/2013 | Khadhraoui et al. |
| 2014/0354639 A1 | 12/2014 | Rockwood |
| 2016/0047924 A1 | 2/2016 | Krohn et al. |
| 2016/0070023 A1 | 3/2016 | Herrmann et al. |
| 2016/0132754 A1 | 5/2016 | Akhbardeh et al. |
| 2016/0238729 A1 | 8/2016 | Warner et al. |
| 2016/0245941 A1 | 8/2016 | Ronholt et al. |
| 2017/0075030 A1* | 3/2017 | Wheelock ............ G01V 99/005 |
| 2018/0347320 A1* | 12/2018 | Renaudeau .......... G01V 99/005 |

OTHER PUBLICATIONS

Moghaddam, P. P., & Herrmann, F. J. (2010). Randomized full-waveform inversion: a dimenstionality-reduction approach. 2010 SEG Annual Meeting, Society of Exploration Geophysicists. pp. 1-5.

Van Leeuwen, T., & Herrmann, F. J. (2014). 3D frequency-domain seismic inversion with controlled sloppiness. SIAM Journal on Scientific Computing, 36(5), S192-S217.

Herrmann, F. J., Hanlon, I., Kumar, R. et al. (2013). Frugal full-waveform inversion: From theory to a practical algorithm. The Leading Edge, 32(9), 1082-1092.

* cited by examiner

Lagrange polynomials

Bernstein polynomials

MULTI-SCALE MANIFOLD LEARNING FOR FULL WAVEFORM INVERSION

TECHNICAL FIELD

Embodiments of the present disclosure are directed to improved methods for performing full waveform inversion (FWI) in seismology to estimate the properties of a propagating subsurface from direct measurements of acoustic/elastic energy, where the properties are described by parameters of an acoustic/elastic wave equation in three spatial dimensions.

DISCUSSION OF THE RELATED ART

Earth materials are heterogeneous, and the accurate estimation of coefficients that define these heterogeneous media within the advection diffusion equations arises in many domains of applied geophysics and seismology. One specific example is Full Waveform Inversion (FWI), an emerging subsurface imaging technique that uses acoustic/elastic energy to locate oil and gas bodies by imaging the subsurface. As shown in FIG. 1, elastic waves are used to probe a site under investigation, by placing seismic vibrators on or above the ground surface. In FIG. 1, the source of the elastic waves is an underwater air gun. These waves propagate through the ground, and due to the heterogeneous geological structure of the site under investigation, multiple reflections and refractions occur. For example, FIG. 1 depicts layers of sedimentary rock, impermeable rock, and porous reservoir rock containing water, oil, and gas. Each of these layers reflects the shock waves. The response of the site to the seismic vibrator is measured by sensors, such as hydrophones shown in FIG. 1, also placed on or above the ground surface. Standard FWI follows the following general procedure: (1) an initial estimate of the subsurface parameters is performed, e.g., by using a state-of-the-art geostatistical inversion; (2) the synthetic data are modeled by solving either acoustic or elastic wave-equation; (3) the subsurface parameters are then updated, by means of an optimization technique, say quasi-Newton method, to reduce the misfit between the observed and synthetic data. Steps 2 and 3 of the procedure are iteratively repeated until the data-misfit is sufficiently small. For details, see A. Fichtner, "Full Seismic Waveform Modeling and Inversion, Advances in Geophysical and Environmental Mechanics and Mathematics, Springer", 2010 (hereinafter Fichtner), the contents of which are herein incorporated by reference in their entirety.

Note that other areas of the earth sciences also utilize techniques for efficient and accurate estimation of parameters describing the geologic medium, such as reservoir simulation, which involved estimating the permeability and porosity of a reservoir, such as an oil reservoir, and ground water modeling, which involves estimating permeability and porosity to/from well test and water level data to reconstruct the subsurface structure of an aquifer from production data to predict future oil production.

To the knowledge of the inventors, there is no prior art that appears to explicitly disclose a method that recursively fits a sequence of Bernstein cones to the observed data by means of an optimization method, e.g. a quasi-Newton method, which minimizes the data misfit in the specific manner outlined in the present disclosure.

SUMMARY

Exemplary embodiments of the present disclosure are directed to computational aspects of inverse problems for wave equations, namely, given data in the form of direct observations of an acoustic/elastic wave-field, the coefficients of the acoustic/elastic wave equation in three spatial dimensions are estimated by means of an optimization method which fits a recursive sequence of convex nonnegative cones, generated by conic combinations of multidimensional Bernstein polynomials, to the observed data by (i) representing the coefficients of the wave equation as combinations of Bernstein polynomials with non-negative coefficients, and (ii) selecting the latter in such a way that the data misfit functional along the trajectories of the wave equation is minimized. Methods according to embodiments of the disclosure operate in time domain, i.e. wave equation is not transformed into Helmholtz equation by means of Fourier transform, but rather rely upon the following results, known from the scientific literature:

1. solvability and regularity of the solution for the elastic/acoustic wave equation;
2. spatial discretization of the wave equation by means of the spectral element method;
3. time discretization of the discretized space wave equation by means of the explicit Newmark time integrator; and
4. quasi-Newton optimization method.

According to an embodiment of the disclosure, there is provided a method of analyzing acoustic/elastic waves to determine subsurface structure of the earth that includes receiving a plurality of observations of a seismic acoustic/elastic wave-field from a plurality of sensors; generating a plurality of Bernstein grids of differing resolutions; calculating a data misfit of the plurality of observations with respect to an initial subsurface structure model defined in terms of conic combinations of Bernstein polynomials on a lowest resolution Bernstein grid, and mapping the data misfit from the Bernstein grid onto a Lagrangian grid; updating the subsurface structure model by minimizing the data misfit between the plurality of observations and observations obtained by a simulation; increasing resolution of the Bernstein grid and recomputing the updated subsurface structure model on the increased resolution Bernstein grid; and mapping the recomputed subsurface structure model onto the Lagrangian grid.

According to a further embodiment of the disclosure, the steps of updating the subsurface structure model, increasing resolution of the Bernstein grid and recomputing the updated subsurface structure model, and mapping the recomputed subsurface structure model onto the Lagrangian grid are repeated while the Bernstein grid resolution is less or equal than the Lagrangian grid resolution.

According to a further embodiment of the disclosure, updating the subsurface structure model by minimizing the data misfit between the plurality of observations and observations obtained by a simulation includes calculating a wave field as a function of time over a finite time interval by running a forward simulation; calculating an adjoint field as a function of time over the finite time interval by running a backward simulation based on the wave field; calculating a gradient of the misfit functional from the wave field and the adjoint field, and calculating the misfit from the gradient; estimating an updated subsurface structure model on the Bernstein grid that reduces the misfit functional itself; and mapping the updated subsurface structure model onto the Lagrangian grid.

According to a further embodiment of the disclosure, the steps of calculating a wave field, calculating an adjoint field, calculating a gradient of the misfit functional and the misfit, estimating an updated subsurface structure model, and mapping the updated subsurface structure model onto the Lagrangian grid are repeated while a stop condition is not satisfied. The stop condition is $|J(m_k)-J(m_{k-1})|<\text{Tolerance}\times J(m^*)$, where $m_k$ is a current estimate of the subsurface structure model, $m_{k-1}$ is a previous estimate of the subsurface structure model, J( ) is the misfit functional, m* is a subsurface structure model at a previous resolution of the Bernstein grid, and Tolerance changes on a case-by-case basis.

According to a further embodiment of the disclosure, the method includes repeating the steps of minimizing a data misfit of the plurality of observations with respect to an initial subsurface structure model, updating the subsurface structure model, increasing resolution of the Bernstein grid and recomputing the updated subsurface structure model on the increased resolution Bernstein grid; and mapping the recomputed subsurface structure model onto the Lagrangian grid for different initial subsurface structure models, and selecting a subsurface structure model that yields a smallest misfit functional as a best subsurface structure model.

According to a further embodiment of the disclosure, the initial subsurface structure model is defined as $m=\Sigma_i a_i B_i(x)$ where $B_i$ is an i-th Bernstein polynomial defined over the standard element $x\in[0,1]^3$ and extended to the entire Bernstein grid by continuity, and $a_i$ are constants where $a_i \geq 0$. Calculating a wave field as a function of time over a finite time interval by running a forward simulation solves M(m) ü+F(m, u)=s for u where u is the wave field, m is the subsurface structure model defined for points from all Bernstein polynomials in the Bernstrin grid, M is a mass matrix, s is seismic source modeled as a point source, F(m, u) is a force where $F(m, u) \equiv K(m) u$ where K is a stiffness matrix. Calculating an adjoint field as a function of time over the finite time interval by running a backward simulation based on the wave field solves $ä^T M + a^T K = \partial_u r$ for a where a is the adjoint field, $a(T)=\dot{a}(T)=0$, u is the wave field, $r(u, m, t):=\|d(t)-V u(m, t)\|^2$, $r(x)>0$ for $x\neq 0$, is a noise model that quantifies the error between the plurality of observations d(t) and the wave field u(m, t) at locations of the plurality of sensors and V is a sampling matrix. The misfit functional is $J(u,m)=\Sigma_s^{N_{sources}} \int_0^T r(u, m, t) dt$, and the gradient of the misfit functional is $\partial_m J=\Sigma_s^{N_{sources}} \int_0^T \dot{\beta} dt$ where $\dot{\beta}=(ä^T \partial_m M + a^T \partial_m K) u + \partial_m r$, s.t. $\beta(0)=0$, and $\partial_m K=(K(B_1), \ldots, K(B_n))$ are sensitivity matrices.

According to another embodiment of the disclosure, there is provided a non-transitory program storage device readable by a computer, tangibly embodying a program of instructions executed by the computer to perform the method steps for analyzing acoustic/elastic waves to determine subsurface structure of the earth.

DETAILED DESCRIPTION OF EXEMPLARY EMBODIMENTS

Figure 1:
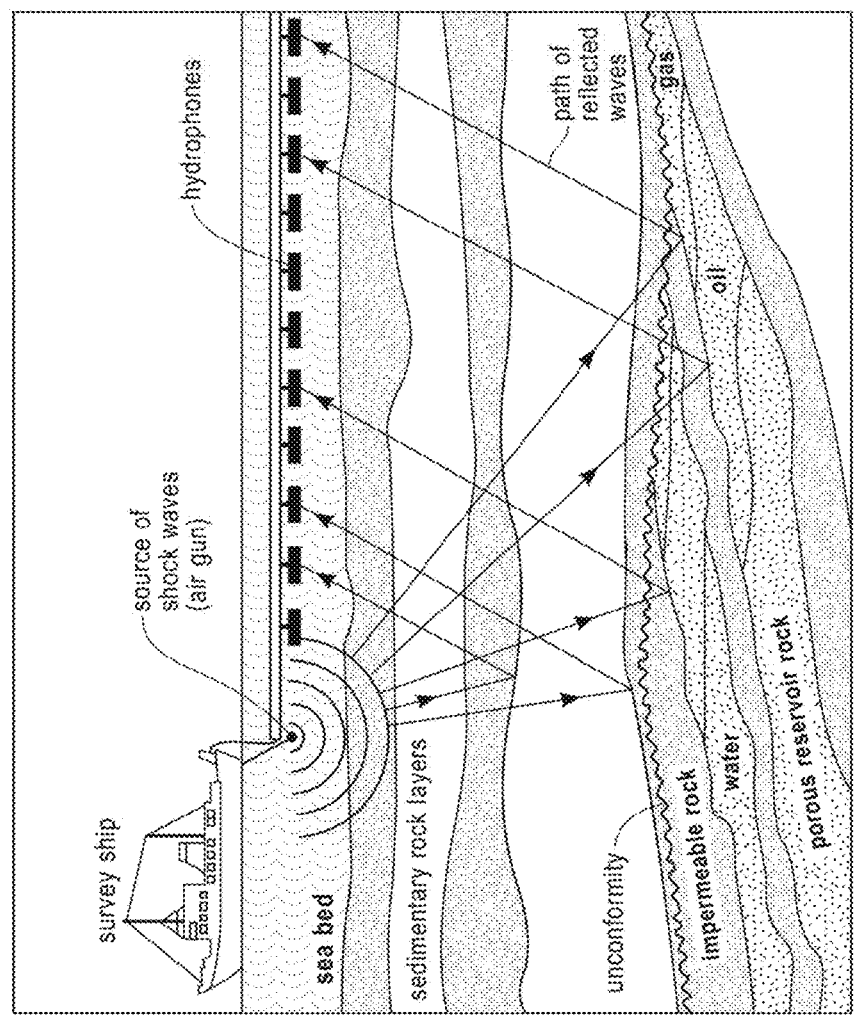
FIG. 1 illustrates how elastic waves can be used to probe a site under investigation by placing seismic vibrators on or above the ground surface, according to embodiments of the disclosure.

Exemplary embodiments of the disclosure as described herein generally provide systems and methods for to improved methods for performing full waveform inversion (FWI) in seismology to estimate the properties of a propagating subsurface from direct measurements of acoustic/elastic energy. While embodiments are susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

As used herein, the term "image" refers to multi-dimensional data composed of discrete image elements (e.g., pixels for 2-dimensional images and voxels for 3-dimensional images). The image may be, for example, an image of a subject collected by any imaging system known to one of skill in the art. Although an image can be thought of as a function from $R^3$ to R, methods of the disclosure are not limited to such images, and can be applied to images of any dimension, e.g., a 2-dimensional picture or a 3-dimensional volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Embodiments of the disclosure create a computer model of the surveyed region with a choice of subsurface material properties known as the 'earth model', assume that a governing equation such as the acoustic or elastic wave equations are representative of the physics, and perform a forward simulation of the wave field subject to the same sources. From this simulation, synthetically generated seismograms can be created and the discrepancy between the experimental and computational seismograms can be assessed. The level of misfit can be quantified in various ways depending upon the assumptions regarding the noise characteristics. The misfit functional, or noise model, is used to direct the non-linear optimization process of inversion in updating the "earth model", i.e. the subsurface material properties. Since the inverse problem is by nature ill-posed, a-priori information such as structure, sparsity, lower/upper bounds for the material densities etc., is incorporated, as well as constraints, such as positivity, to constraint the solution space. Thus, an objective of an inversion according to an embodiment is to find a feasible solution that minimizes a compromise between the aforementioned data misfit and a-priori information. At this point one may infer that the current a-posteriori subsurface estimate model is a sufficient approximation to reality, or alternatively, devise means to quantify uncertainty.

Exemplary embodiments of the disclosure can provide a system for computing the spectral element numerical solution of the acoustic/elastic wave equation in 2D/3D on a structured grid with absorbing/free surface boundary conditions. Further embodiments of the disclosure can provide a system for generating a recursive sequence of Bernstein cones, i.e., convex non-negative cones generated by conic combinations of multidimensional Bernstein polynomials. Further embodiments of the disclosure can provide a system for mapping the coefficients of the acoustic/elastic wave equation to/between Bernstein cones and onto the Lagrange grid used by a spectral element method. Further embodiments of the disclosure can provide a system for computing the gradient of a generic smooth and non-convex or convex and possibly non-smooth data misfit function ($L_1$, $L_2$) with respect to a given Bernstein cone. Further embodiments of the disclosure can provide a system which recursively fits a sequence of Bernstein cones to the observed data by means of an optimization method which minimizes the data misfit along the solutions of the wave equation.

Exemplary embodiments of the disclosure make use of a spectral element numerical model of the wave equation, a description of a misfit functional, a grid generation algorithm, and a description of the source terms and boundary conditions.

Embodiments of the disclosure discretize the wave-field on the finer Lagrange grid while material properties of the sub-surface model are defined on a typically coarser Bernstein grid, which reduces the dimensionality of the inverse problem, as the coarse Bernstein grid requires less independent parameters to represent the "earth model" than the corresponding Lagrange grid. As such, a dimensionality reduction is applied in the parameter space as opposed to the widely used low-pass filtering of the observed signals which is widely applied in the so-called frequency domain FWI (see, e.g., Fichtner). Embodiments of the disclosure can preserve positivity and completeness of the manifold, i.e., any positive function can be uniformly approximated by Bernstein polynomials. This enables a fast computation of positive (Bernstein) polynomials, and allows one to use a very simple box constraints in the optimization procedure as opposed to using conventional positivity-preserving techniques that may lead to more complex optimization tasks. Since the dimension of the parameter space, i.e., the Bernstein grid, is low, the data misfit is expected to have just a few local minima, and the minimization procedure will most likely find a global optimum. In addition, a computation of the gradient according to an embodiment uses very sparse matrices which facilitates efficient storage of the arrays.

Embodiments of the disclosure assume the elastic wave equation to be the governing equation. The elastic wave equation is a statement of Newton's second law of motion applied to a continuous solid material and is defined as $$\rho \partial_{tt} u_i = \partial_{x_j} \sigma_{ij} + f_i, \quad (1)$$

where $x \in \Omega \subset \mathbb{R}^3$ denotes a computational solid domain with boundary $\Gamma$, $t \in [0, T]$, $i,j \in [1,2,3]$, $\rho(x)$ is the mass density, $u(x, t)$ is the displacement vector field, $\sigma(x, t)$ is the stress tensor field, and $f(x, t)$ is a seismic source modeled in the form of a point source $f(x, t) = \theta(t) \cdot \delta(x - x_s)$ applied at $x_s$ using a standard Ricker wavelet $\theta(t)$, which is a negative normalized second derivative of a Gaussian function. Approximating the earth model with a linear isotropic relation such as Hooke's law, the stress tensor is defined in terms of the displacement gradients by $$\sigma_{ij} = \lambda \delta_{ij} \partial_{x_k} u_k + \mu(\partial_{x_i} u_j + \partial_{x_j} u_i), \quad (2)$$

where $\lambda(x)$ and $\mu(x)$ are the first and second Lame parameters respectively. Note that $\mu$ can be physically interpreted as the shear modulus and $\lambda = \kappa - \frac{2}{3}\mu$, where $\kappa$ is the bulk modulus. The wave equation is subject to the standard initial conditions $u_i = \partial_t u_i = 0$, free surface boundary conditions $\sigma_{ij} n_j = 0$ and absorbing boundary conditions $\sigma_{ij} n_j = -\rho v \partial_t u_i$, respectively, where $n_j$ denotes the normal to the boundary $\Gamma$ and $v$ denotes the elastic wave speed, which will be P wave speed for displacement components parallel to $n_j$ and S wave speed for components perpendicular to $n_j$. Using a Galerkin projection, the wave equation can be transformed into $$\int_\Omega \psi \rho \partial_{tt} u_i d\Omega + \int_\Omega \partial_{x_j} \psi \sigma_{ij} d\Omega = \int_\Omega \psi f_i d\Omega + \int_\Gamma \psi \sigma_{ij} d\Gamma_j \quad (3)$$

where $\psi$ denotes the choice of Lagrange polynomial basis functions.

Figure 2A:
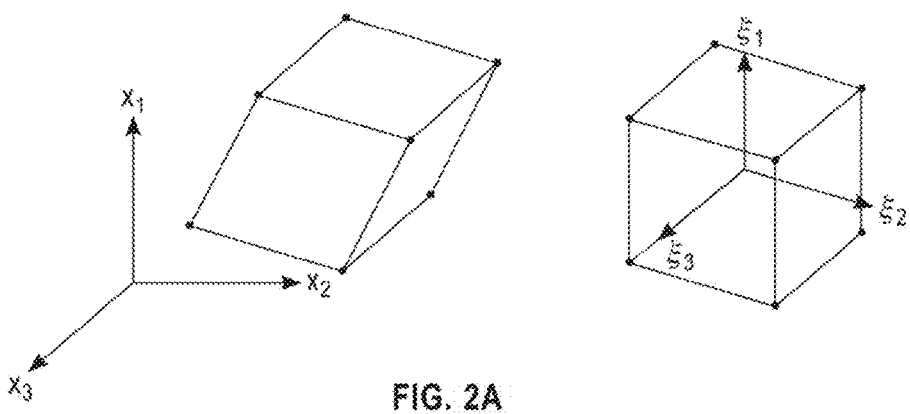
FIG. 2A illustrates the transformation of a hexahedral element from x to S coordinates, according to embodiments of the disclosure.

In the numerical solution of partial differential equations, the spectral element method (SEM) is a formulation of the Galerkin projection method disclosed in Fichtner that uses high degree piecewise polynomials as basis functions. Using the spectral element method for the spatial discretization of EQ. (3), the computational domain is defined as a tessellation of $N_e$ hexahedral elements as shown in FIG. 2C with the displacement field approximated as $u_i(x, t) \approx \psi_{pqr}(x) u_{i,pqr}(t)$, such that $$\int_{\Omega^e} \psi_{abc} \rho \psi_{pqr} \partial_{tt} u_{i,pqr} d\Omega + \int_{\Gamma^e} \psi_{ab} \rho v \psi_{pq} \partial_t u_{i,pq} d\Gamma + \int_{\Omega^e} \partial_{x_j} \psi_{abc} \sigma_{ij} d\Omega = \int_{\Omega^e} \psi_{abc} f_i d\Omega \quad (4)$$

Figure 2B:
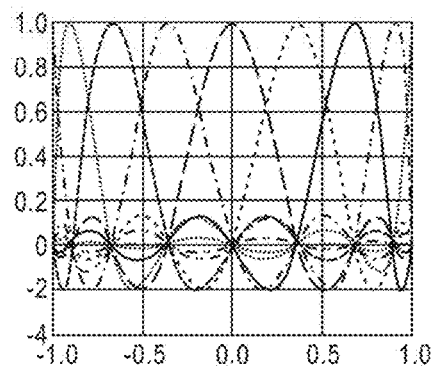
FIG. 2B illustrates a family of 8th order Lagrange polynomials defined for $\xi_i \in [-1, +1]$, according to embodiments of the disclosure.
Figure 2C:
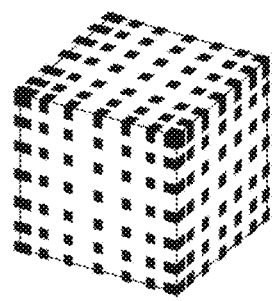
FIG. 2C illustrates an 8th order spectral element depicting the locations of a GLL quadrature/nodal points, according to embodiments of the disclosure.

In a formulation according to an embodiment of the disclosure, the basis functions $\psi_{pqr}$ are taken to be a tensor product of the family of Nth order Lagrange polynomials $\psi_{pqr} = l_p l_q l_r$, as shown in FIG. 2B. After applying a geometric transformation to a reference element $\xi_i \in [-1, +1]$, shown in FIG. 2A, performing the integration with Gauss-Legendre-Lobatto (GLL) quadrature, and then global assembly, gives the system of ODEs $$M(m) \ddot{u} + F(m, u) = s, \quad (5)$$

where $u$ is the global set of displacements, $m$ is the Earth model, which is a global set of densities and Lame' parameters $\lambda$ and $\mu$ defined for GLL points from all spectral elements in the grid. The mass $M$, force $F$ and source $s$ vectors are given by $$M = \Sigma_{e=1}^{N_e} \Sigma_{f,g,h=1}^{N+1} w_f w_g w_h \psi_{abc} \rho \psi_{pqr} \mathcal{J} |_{\xi_{1,f}, \xi_{2,g}, \xi_{3,h}},$$

$$F = \Sigma_{e=1}^{N_e} \Sigma_{f,g,h=1}^{N+1} w_f w_g w_h \partial_{\xi_k} \psi_{abc} \partial_{\xi_i} x_j \sigma_{ij,pqr} \mathcal{J} |_{\xi_{1,f}, \xi_{2,g}, \xi_{3,h}},$$

$$s = \Sigma_{e=1}^{N_e} \Sigma_{f,g,h=1}^{N+1} w_f w_g w_h \psi_{abc} f_i \mathcal{J} |_{\xi_{1,f}, \xi_{2,g}, \xi_{3,h}}, \quad (6)$$

where $N_e$ is a number of elements in the discretization of EQ. (4), N is the order of the Lagrange polynomials, $\mathcal{J}$ defines the Jacobian of the transformation mapping to the reference element, and $w_f$ denote the weights associated with the GLL quadrature. Due to the cardinal interpolation properties of the Lagrange polynomials $l_a(\xi_f) = \delta_{af}$ and the specific choice of GLL quadrature, the mass matrices, which do not involve spatial derivatives of the Lagrange polynomials, are diagonal and hence trivially assembled and stored as 1D arrays. In addition, $F(m, u) = K(m) u$ where $K$ is a well known, sparse, but non-diagonal, stiffness matrix in solid mechanics, which linearly depends on m, that is $K(m_1+m_2) = K(m_1)+K(m_1)$. In terms of EQS. (6), $K(m)=-M^{-1} S(m)$, or $$K = \sum_{e=1}^{N_e} \sum_{f,g,h=1}^{N+1} w_f w_g w_h \partial_{\xi_k} \psi_{abc}\left(\frac{\partial \xi_k}{\partial x_j}\right) c_{ijkl} \frac{1}{2} \quad (7)$$

$$\left(\partial_{\xi_m} \psi_{pqr}\left(\frac{\partial \xi_m}{\partial x_l}\right) + \partial_{\xi_n} \psi_{pqr}\left(\frac{\partial \xi_n}{\partial x_k}\right)\right) \mathcal{J}|_{\xi_{1,f},\xi_{2,g},\xi_{3,h}}$$

The earth model m is a representation of the sub-surface as a conic combination of the Bernstein polynomials. To update the earth model, a generic data misfit functional relating the solution of the discrete forward elastic model to the observed data is defined as $$J(u,m) = \Sigma_s^{Nsources} \int_0^T r(u,m,t) dt \quad (8)$$

quantifies the distance in some norm between the synthetic seismograms u(m, t), generated by an SEM method from the given subsurface model m, and the observed seismograms d(t) at the receiver's locations defined by the matrix V: $r(u, m, t) := \|d(t) - V u(m, t)\|^2$, and $r(x) > 0$ for $x \neq 0$ is a noise model that quantifies the error between observed and computed displacements at a number of sensor locations. Estimation of the earth model, m, given the observed data and involves finding an m that minimizes J(u,m): $m = \arg\min_m J(u,m)$, and requires the computation of $\partial_m J$. The latter is achieved by introducing the following adjoint equation:

$$\ddot{a}^T M + a^T K = \partial_u r; a(T) = \dot{a}(T) = 0, \quad (9)$$

where u solves EQ. (5). By defining the following system of first order ODEs:

$$\dot{\beta} = (\ddot{a}^T \partial_m M + a^T \partial_m K) u + \partial_m r; s.t. \beta(0) = 0, \quad (10)$$

then the gradient of the misfit functional is given by $$\partial_m J = \Sigma_s^{Nsources} \int_0^T \beta dt. \quad (11)$$

Figure 3:
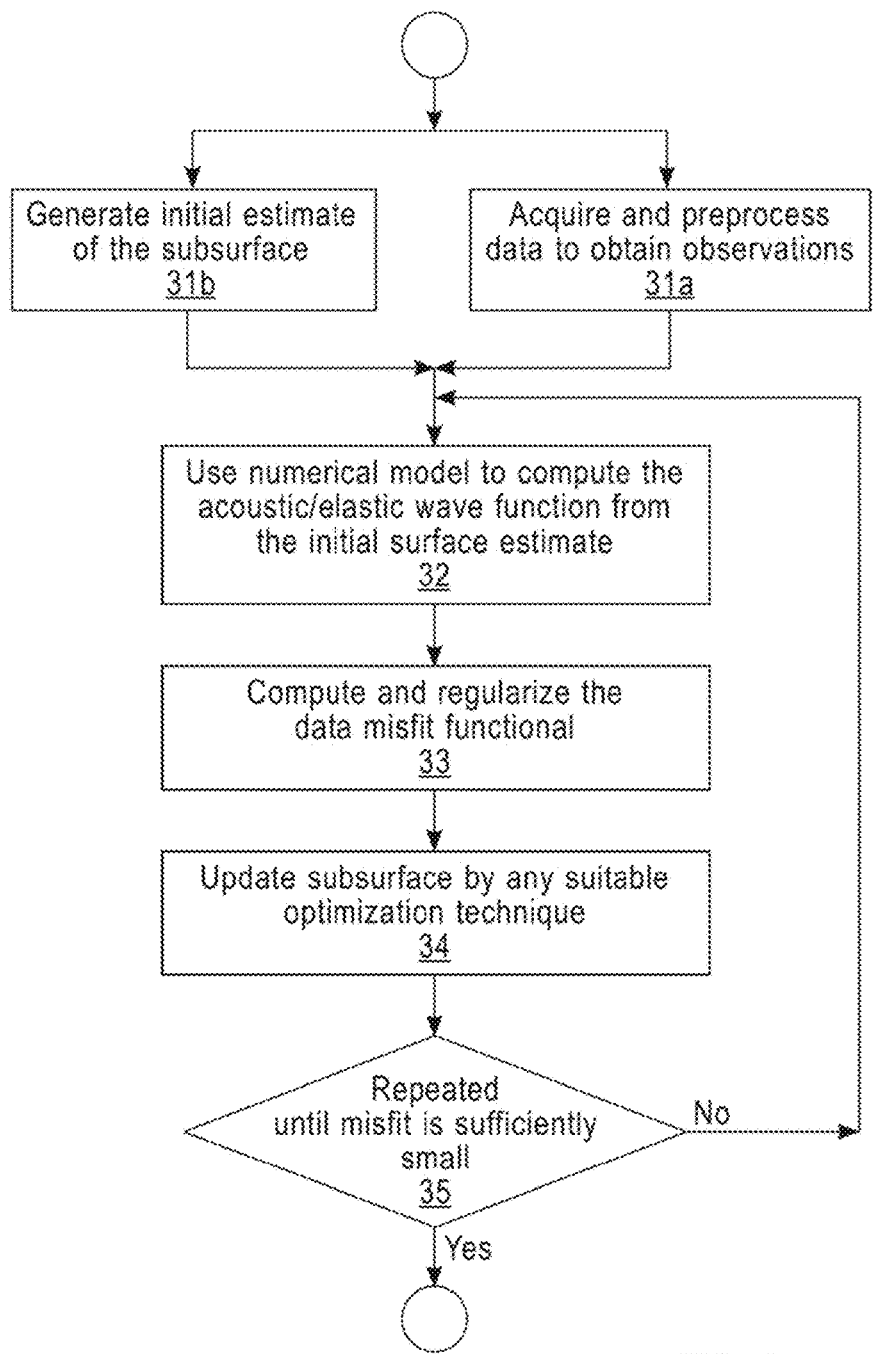
FIG. 3 is a flowchart that illustrates the main components of a state-of-the-art Full Waveform Inversion (FWI) procedure.

FIG. 3 is a flowchart that illustrates the main components of a Full Waveform Inversion (FWI) procedure according to an embodiment of the disclosure. Referring now to the figure, the first steps of an FWI procedure are acquiring and preprocessing data to obtain observations d(t) at step 31a, and generating an initial estimate of the subsurface m(0) at step 31b. At step 32, a numerical model is created that computes the acoustic/elastic wave function u(t, m(k)) from the initial surface estimate m(0), which relates the subsurface function m(k) to the observations by means of a sampling matrix V: $d(t) \sim V u(t, m(k))$. At step 33, the data misfit J(d, Vu) is computed and is regularized by a regularization function S(m). The subsurface m(k) is then updated at step 34 by any suitable optimization technique, and the updated subsurface is used to update the numerical model at step 32, and the process is repeated from step 35 until the misfit is sufficiently small.

Figure 4:
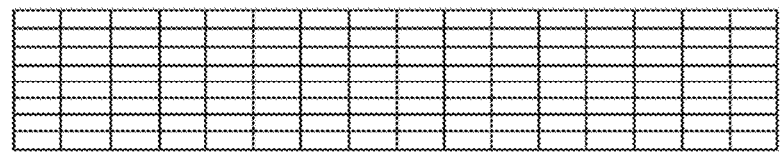
FIG. 4 illustrates a Lagrangian grid and Lagrangian polynomials, according to an embodiment of the disclosure.
Figure 4:
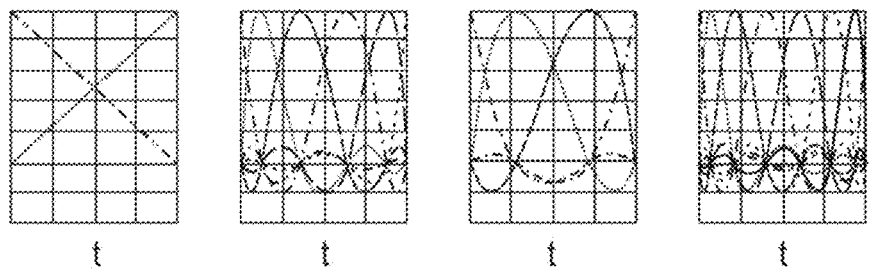

According to embodiments of the disclosure, the subsurface properties grid is decoupled from the computational grid. The computation grid, which is a Lagrangian grid, can be, for example, a regular grid of hexahedral elements, illustrated in upper figure of FIG. 4, discretized with Lagrange polynomials to represent the solution of the wave equation. Note that Lagrange polynomials may go negative, as illustrated in the lower figure of FIG. 4.

Figure 5:
FIG. 5 illustrates a Bernstein grid and Bernstein polynomials, according to an embodiment of the disclosure.
Figure 5:
Figure 5:
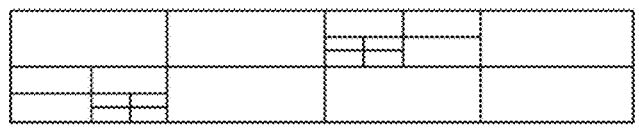
Figure 5:
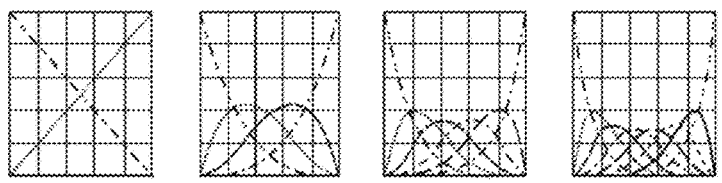

The subsurface properties grid, which is a Bernstein grid, can be, for example, an octree style grid of hexahedral elements, illustrated in the upper figure of FIG. 5, which is generated from a given convex positive cone of Bernstein polynomials to represent the subsurface material properties.

The cone of Bernstein polynomials is a conic (positive) combination of a given finite set of multidimensional Bernstein polynomials $\{B_i\}$, which are defined over the standard element $x \in [0,1]^3$ by $\Sigma_i a_i B_i(x)$ for constants $a_i \geq 0$, as illustrated in the lower figure of FIG. 5, and continuously extended to the entire grid by 0 so that each of them has a compact support. Note that Bernstein polynomials are positive, and the coefficients of the aforementioned conic combination represent approximations of the values of the subsurface model at the uniform grid points associated with the Bernstein grid.

An optimization according to an embodiment is performed on the Bernstein grid and the material properties are interpolated onto the Lagrange grid for solution of the wave equation. To interpolate from the Bernstein grid to the Lagrangian grid, form an expression for the subsurface model on the Bernstein grid, namely $m_N(x) = \Sigma_i^N m(x_i) B_i(x)$ where $x_i$ are some grid points of the Bernstein grid, and then compute $m_N(x)$ on the Lagrange grid to use it in the wave equation discretization.

Figure 6A:
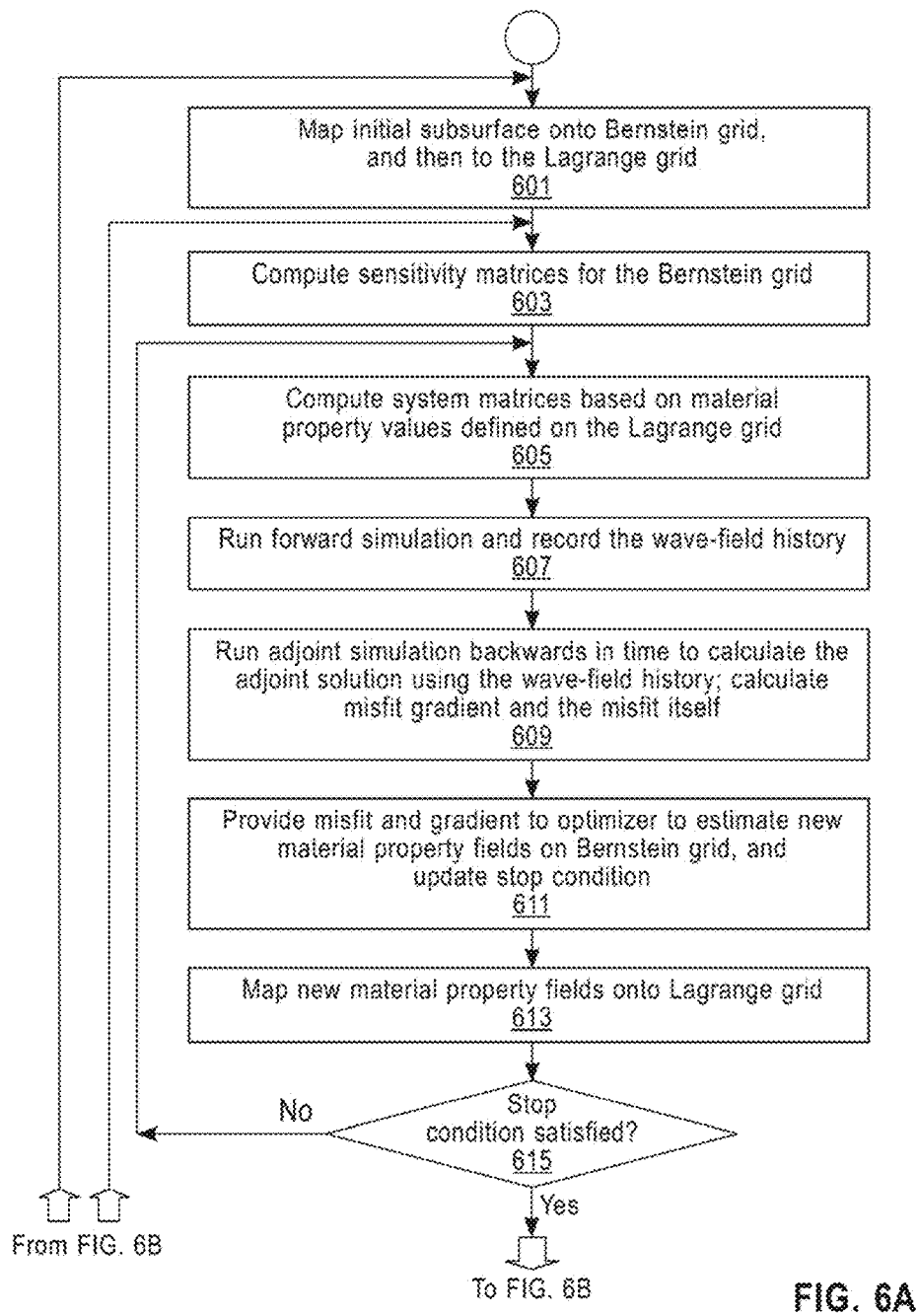
FIGS. 6A-6B is a flowchart of a method according to an embodiment of learning a recursive manifold from the data.
Figure 6B:
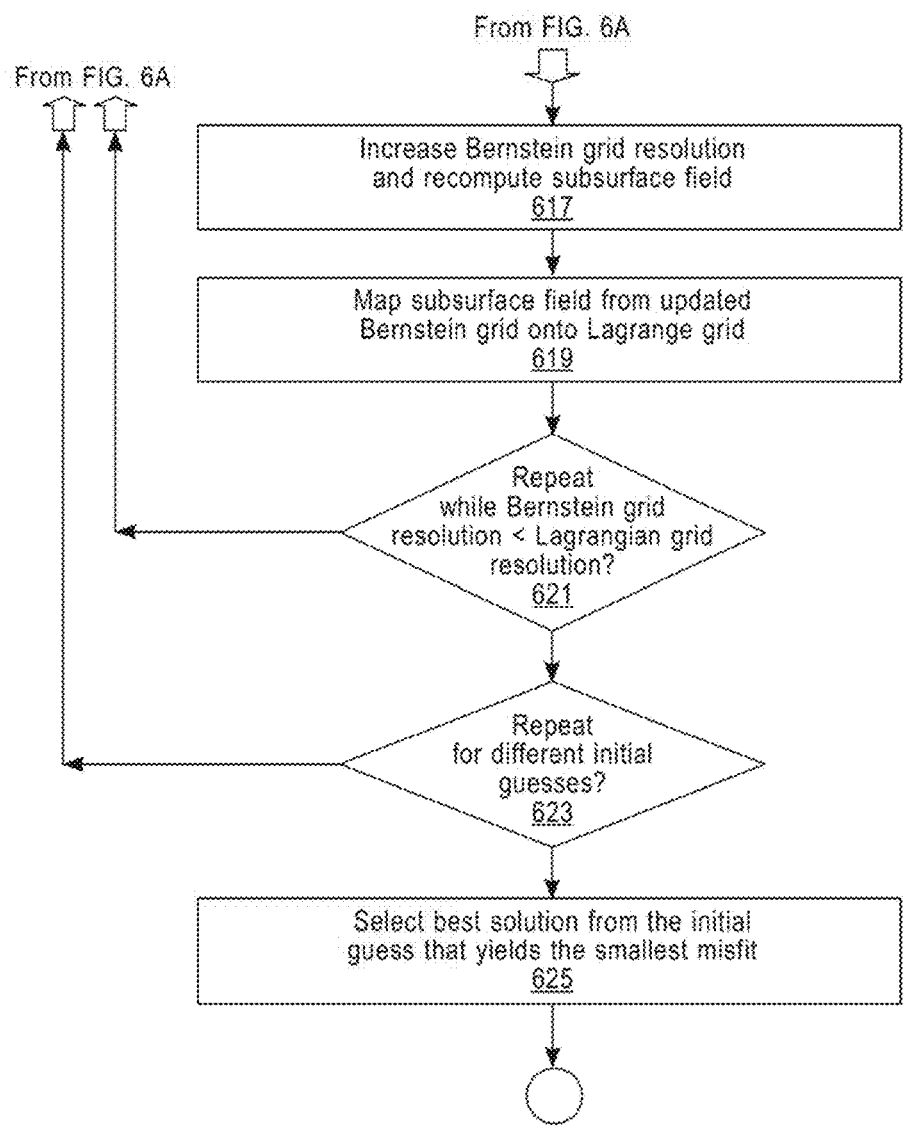

According to embodiments of the disclosure, a recursive manifold is learned from the data. FIGS. 6A-6B is a flowchart of a method according to an embodiment of learning a recursive manifold from the data. Initializations for a method according to an embodiment include (1) defining the physical domain; (2) define the boundary conditions; (3) setting up excitation sources and receivers of reflected signals; (4) generating an initial guess m of the sub-surface model by any physically feasible (random) fields; and (5) generating a spatial and temporal discretization of the acoustic/elastic wave equation by selecting the number of elements and their geometry, choosing the order of the Lagrange polynomials, generating a Lagrange grid, and generating a number of Bernstein grids. The excitation sources are activated to generate acoustic/elastic waves and observations d(T) are recorded at the receivers either collectively or separately per each source over a time interval [0 . . . T].

Referring now to FIG. 6A, given an initial Bernstein cone in low spatial resolution, i.e., a small number of Bernstein polynomials, a method according to an embodiment begins at step 601 by mapping the initial subsurface m onto the Bernstein grid to obtain a conic combination $\Sigma_i a_i B_i(x)$ of the Bernstein polynomials representing the subsurface model at the current Bernstein grid resolution. This conic combination is then used to generate the stiffness matrix K for the spectral element approximation of the wave equation. More specifically, $K(m) = \Sigma_i a_i K(B_i)$ and the coefficients $a_i$ are obtained by minimizing the data misfit functional along the solutions of the wave equation, as described below. At step 603, the sensitivity matrices, such as dK/dm, are computed for the current Bernstein grid. The sensitivity matrices are defined as follows: $K_i := K(B_i)$ where $B_i$ is the i-th Bernstein polynomial. In other words, spectral element stiffness matrices are computed for each Bernstein polynomial which yields an array of sensitivity matrices: dK/dm= $(K(B_1), \ldots, K(B_{i_d}))$. Then, an optimization method is used to decrease the misfit between true observations O(T) and the those obtained by simulation. More specifically, at step 605, the system matrices M and K are computed, and $K(m) = \Sigma_i a_i K(B_i)$, where each Bernstein polynomial is evaluated at the Lagrangian grid. A forward simulation is run at step 607, and the wave-field history $U(T) = \{u(t), 0 <= t <= T\}$ is recorded, either entirely or using any checkpointing algorithm, such as that disclosed in Andreas Griewank and Andrea Walther, "Algorithm 799: Revolve: An Implementation of Checkpointing for the Reverse or Adjoint Mode of Computational Differentiation", ACM Trans. Math. Softw. 26, 1 (March 2000), pgs. 19-45, (hereinafter Griewank), the contents of which are herein incorporated by reference in their entirety. To compute the gradient of the misfit functional, J, which is defined by EQ. (11), adjoint EQ. (9) needs to be solved together with EQ. (10) which relies upon sensitivity matrices dK/dm. The adjoint simulation is run backwards in time at step 609 to calculate the adjoint solution a(T), using the previously calculated wave-field history U(T) and the gradient of misfit functional along with the misfit value itself are calculated.

At step 611, the misfit and gradient are provided to the optimizer, which uses them to update the current (initial) representation of the subsurface model, namely the coefficients $a_i$ in $m=\Sigma_i a_i B_i(x)$ by updating the latter using the standard gradient/quasi-Newton method's update, and updates the stopping condition. An exemplary, non-limiting optimizer is the lBFGS quasi-Newton method. The newly obtained material property fields are mapped onto the Lagrange grid at step 613 by simply reevaluating $\Sigma_i a_i B_i(x)$ at the Lagrange grid, and steps 605 to 613 are repeated from step 615 if the stop condition has not been satisfied.

One specific stop condition according to an embodiment is the relative change in the misfit. Namely, according to embodiments, a stop condition is $|J(m_k)-J(m_{k-1})|<\text{Tolerance} \times J(m^*)$, where m* is a model of the subsurface used at the previous resolution of the Bernstein grid, and Tolerance depends on a specific case at hand. For a specific domain and source and receiver configurations, Tolerance can be found by trial and error.

Continuing on FIG. 6B, at step 617, the Bernstein grid resolution is increased by a desired factor, as shown in the $2^{nd}$ and $3^{rd}$ graphs of FIG. 5, and the subsurface field m is recomputed, and the subsurface field is mapped from the updated Bernstein grid onto the Lagrange grid at step 619. Given a representation of the subsurface on the current Bernstein grid which corresponds to the current Bernstein cone, a new Bernstein cone is constructed. The latter contains the current one, and increases the spatial resolution of the Bernstein grid by increasing the number of Bernstein polynomials in the locations where the data misfit function is most sensitive to the small changes of the subsurface. The current representation of the subsurface is then mapped onto the new Bernstein grid corresponding to the new Bernstein cone.

Steps 603 to 619 are repeated from step 621 while the Bernstein grid resolution<the Lagrangian grid resolution, and steps 601 to 621 can be repeated from step 623 for different initial guesses. The best solution would be selected from the initial guess that yields the smallest misfit, at step 625.

Figure 7:
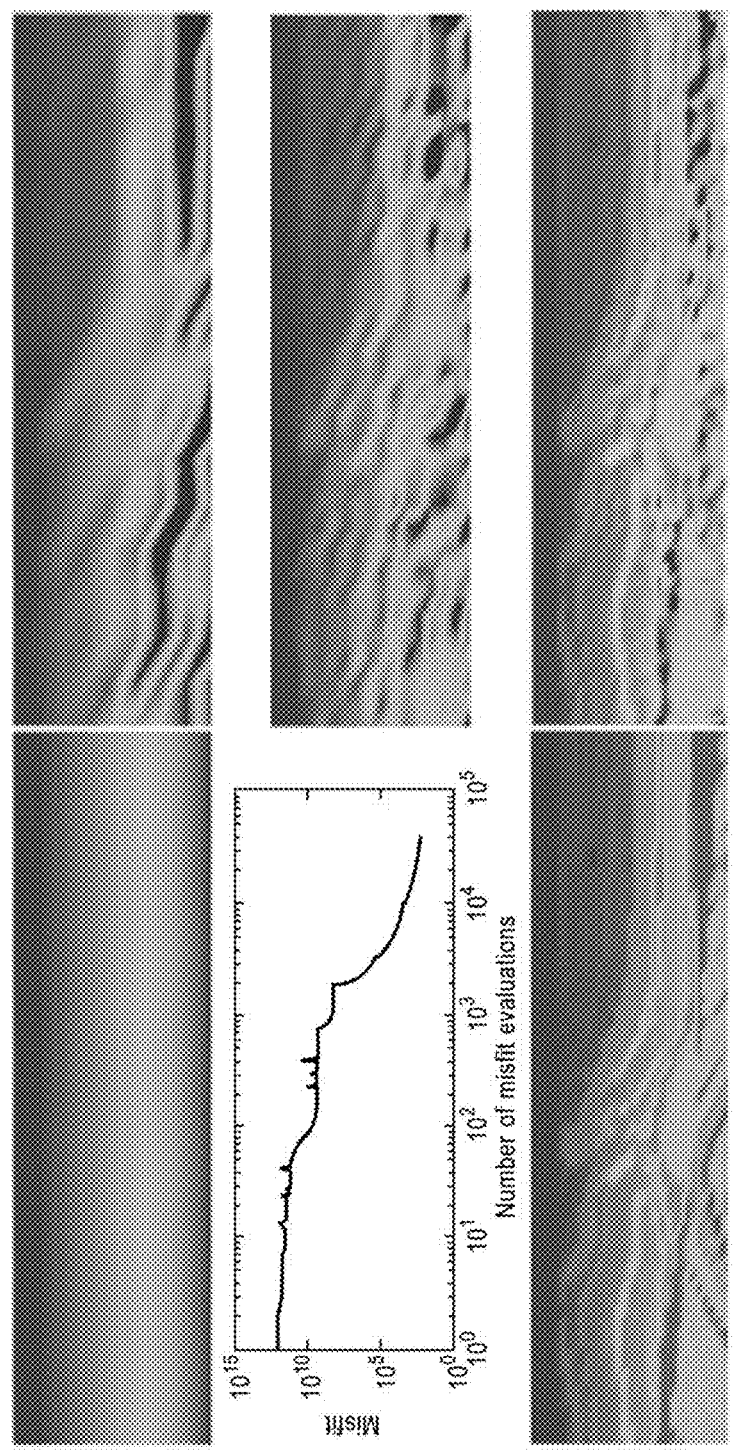
FIG. 7 illustrates a recursive manifold learning example, according to an embodiment of the disclosure.

FIG. 7 illustrates a recursive manifold learning example. The image at the top-left of the figure depicts the initial guess; the graph at the middle-left depicts evolution of the misfit value on a log-log scale plot; the image at the bottom-left illustrates the Marmousi ground-truth model for P-wave velocity; and the images in the right column depict, from top to bottom, consecutive solutions of the inversion at different Bernstein grids: 3 grids in total.

System Implementations

It is to be understood that embodiments of the present disclosure can be implemented in various forms of hardware, software, firmware, special purpose processes, or a combination thereof. In one embodiment, an embodiment of the present disclosure can be implemented in software as an application program tangible embodied on a computer readable program storage device. The application program can be uploaded to, and executed by, a machine comprising any suitable architecture. Furthermore, it is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. An automatic troubleshooting system according to an embodiment of the disclosure is also suitable for a cloud implementation.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 8:
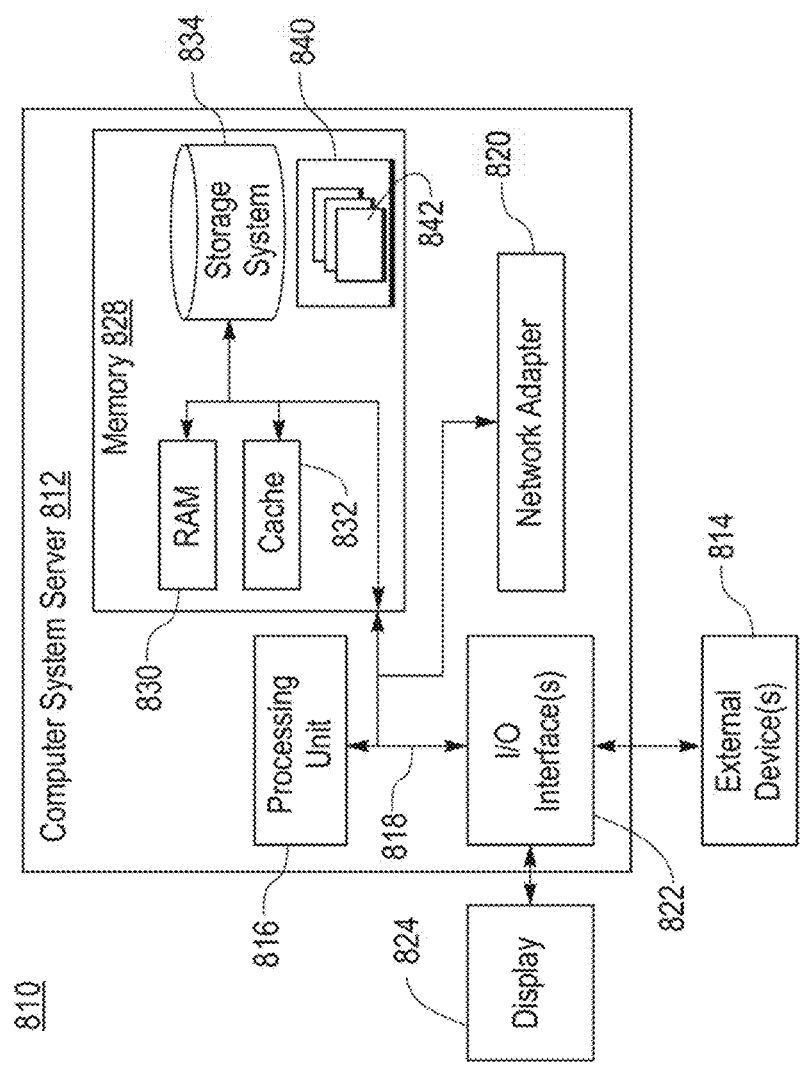
FIG. 8 is a schematic of an exemplary cloud computing node that implements an embodiment of the disclosure.

Referring now to FIG. 8, a schematic of an example of a cloud computing node is shown. Cloud computing node 810 is only one example of a suitable cloud computing node and is not intended to suggest any limitation as to the scope of use or functionality of embodiments of the disclosure described herein. Regardless, cloud computing node 810 is capable of being implemented and/or performing any of the functionality set forth hereinabove.

In cloud computing node 810 there is a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 812 may be described in the general context of computer system executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 in cloud computing node 810 is shown in the form of a general-purpose computing device. The components of computer system/server 812 may include, but are not limited to, one or more processors or processing units 816, a system memory 828, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 812 typically includes a variety of computer system readable media. Such media may be any available media that is accessible by computer system/server 812, and it includes both volatile and non-volatile media, removable and non-removable media.

System memory 828 can include computer system readable media in the form of volatile memory, such as random access memory (RAM) 830 and/or cache memory 832. Computer system/server 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions of embodiments of the disclosure.

Program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the disclosure as described herein.

Computer system/server 812 may also communicate with one or more external devices 814 such as a keyboard, a pointing device, a display 824, etc.; one or more devices that enable a user to interact with computer system/server 812; and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, tape drives, and data archival storage systems, etc.

Figure 9:
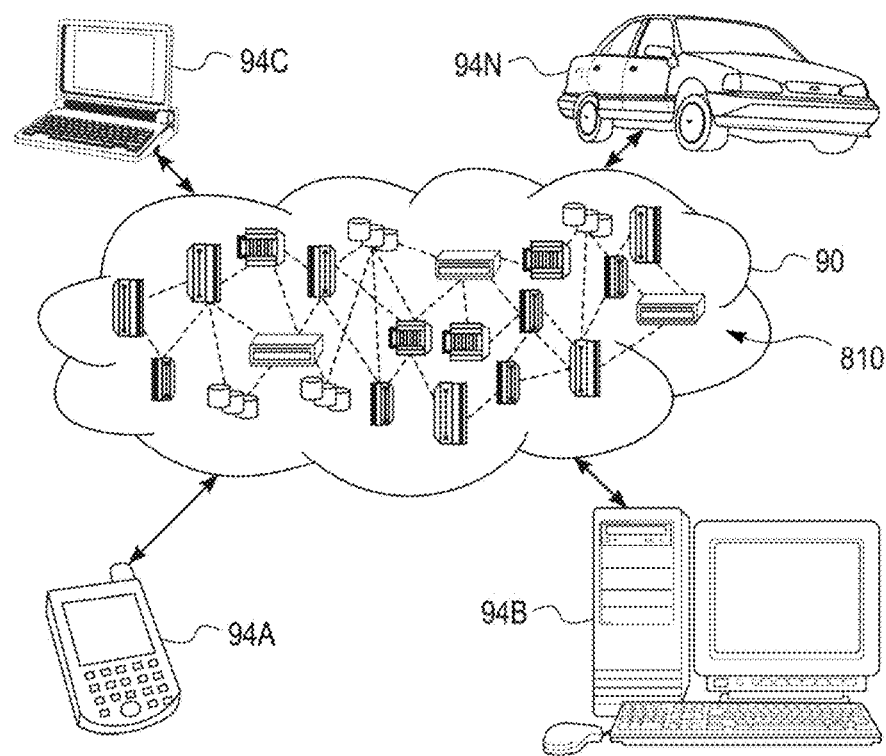
FIG. 9 shows an exemplary cloud computing environment according to embodiments of the disclosure.

Referring now to FIG. 9, illustrative cloud computing environment 90 is depicted. As shown, cloud computing environment u0 comprises one or more cloud computing nodes 810 with which local computing devices used by cloud consumers, such as, for example, personal digital assistant (PDA) or cellular telephone 94A, desktop computer 94B, laptop computer 94C, and/or automobile computer system 94N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 90 to offer infrastructure, platforms and/or software as services for which a cloud consumer does not need to maintain resources on a local computing device. It is understood that the types of computing devices 94A-N shown in FIG. 9 are intended to be illustrative only and that computing nodes 810 and cloud computing environment 90 can communicate with any type of computerized device over any type of network and/or network addressable connection (e.g., using a web browser).

While embodiments of the present disclosure has been described in detail with reference to exemplary embodiments, those skilled in the art will appreciate that various modifications and substitutions can be made thereto without departing from the spirit and scope of the disclosure as set forth in the appended claims.

What is claimed is:

1. A method for analyzing acoustic/elastic waves to determine subsurface structure of the earth, comprising the steps of:
receiving a plurality of observations of a seismic acoustic/elastic wave-field from a plurality of sensors;
generating a plurality of Bernstein grids of differing resolutions;
calculating a data misfit of the plurality of observations with respect to an initial subsurface structure model defined in terms of conic combinations of Bernstein polynomials on a lowest resolution Bernstein grid, and mapping the data misfit from the Bernstein grid onto a Lagrangian grid;
updating the subsurface structure model by minimizing the data misfit between the plurality of observations and observations obtained by a simulation;
increasing resolution of the Bernstein grid and recomputing the updated subsurface structure model on the increased resolution Bernstein grid; and
mapping the recomputed subsurface structure model onto the Lagrangian grid.

2. The method of claim 1, wherein said steps of updating the subsurface structure model, increasing resolution of the Bernstein grid and recomputing the updated subsurface structure model, and mapping the recomputed subsurface structure model onto the Lagrangian grid are repeated while the Bernstein grid resolution is less or equal than the Lagrangian grid resolution.

3. The method of claim 1, wherein updating the subsurface structure model by minimizing the data misfit between the plurality of observations and observations obtained by a simulation comprises:
calculating a wave field as a function of time over a finite time interval by running a forward simulation;
calculating an adjoint field as a function of time over the finite time interval by running a backward simulation based on the wave field;
calculating a gradient of the misfit functional from the wave field and the adjoint field, and calculating the misfit from said gradient;
estimating an updated subsurface structure model on the Bernstein grid that reduces the misfit functional itself; and
mapping the updated subsurface structure model onto the Lagrangian grid.

4. The method of claim 3, wherein said steps of calculating a wave field, calculating an adjoint field, calculating a gradient of the misfit functional and the misfit, estimating an updated subsurface structure model, and mapping the updated subsurface structure model onto the Lagrangian grid are repeated while a stop condition is not satisfied,
wherein said stop condition is $|J(m_k)-J(m_{k-1})|<\text{Tolerance} \times J(m^*)$, wherein $m_k$ is a current estimate of the subsurface structure model, $m_{k-1}$ is a previous estimate of the subsurface structure model, $J(\ )$ is the misfit functional, $m^*$ is a subsurface structure model at a previous resolution of the Bernstein grid, and Tolerance changes on a case-by-case basis.

5. The method of claim 1, further comprising repeating said steps of minimizing a data misfit of the plurality of observations with respect to an initial subsurface structure model, updating the subsurface structure model, increasing resolution of the Bernstein grid and recomputing the updated subsurface structure model on the increased resolution Bernstein grid; and mapping the recomputed subsurface structure model onto the Lagrangian grid for different initial subsurface structure models, and selecting a subsurface structure model that yields a smallest misfit functional as a best subsurface structure model.

6. The method of claim 3, wherein:
the initial subsurface structure model is defined as $m=\Sigma_i a_i B_i(x)$ wherein $B_i$ is an i-th Bernstein polynomial defined over the standard element $x \in [0,1]^3$ and extended to the entire Bernstein grid by continuity, and $a_i$ are constants wherein $a_i \geq 0$;
wherein calculating a wave field as a function of time over a finite time interval by running a forward simulation solves $M(m)\ddot{u}+F(m, u)=s$ for a wherein u is the wave field, m is the subsurface structure model defined for points from all Bernstein polynomials in the Bernstein grid, M is a mass matrix, s is seismic source modeled as a point source, $F(m, u)$ is a force wherein $F(m, u)=K(m) u$ where K is a stiffness matrix;
calculating an adjoint field as a function of time over the finite time interval by running a backward simulation based on the wave field solves $\ddot{a}^T M + a^T K = \partial_u r$ for a wherein a is the adjoint field, $a(T)=\dot{a}(T)=0$, u is the wave field, $r(u, m, t):=\|d(t)-V u(m, t)\|^2$, $r(x)>0$ for $x \neq 0$, is a noise model that quantifies the error between the plurality of observations d(t) and the wave field u(m, t) at locations of the plurality of sensors and V is a sampling matrix;
the misfit functional is $J(u,m)=\Sigma_s^{Nsources} \int_0^T r(u, m, t)dt$;

the gradient of the misfit functional is $\partial_m J = \Sigma_s^{Nsources} \int_0^T \dot{\beta}\, dt$ where $\dot{\beta} = (\ddot{a}^T \partial_m M + a^T \partial_m K)u + \partial_m r$, s.t. $\beta(0) = 0$, and $\partial_m K = (K(B_1), \ldots, K(B_n))$ are sensitivity matrices.

7. A non-transitory program storage device readable by a computer, tangibly embodying a program of instructions executed by the computer to perform the method steps for analyzing acoustic/elastic waves to determine subsurface structure of the earth, the method comprising the steps of:
   receiving a plurality of observations of a seismic acoustic/elastic wave-field from a plurality of sensors;
   generating a plurality of Bernstein grids of differing resolutions;
   calculating a data misfit of the plurality of observations with respect to an initial subsurface structure model defined in terms of conic combinations of Bernstein polynomials on a lowest resolution Bernstein grid, and mapping the data misfit from the Bernstein grid onto a Lagrangian grid;
   updating the subsurface structure model by minimizing the data misfit between the plurality of observations and observations obtained by a simulation;
   increasing resolution of the Bernstein grid and recomputing the updated subsurface structure model on the increased resolution Bernstein grid; and
   mapping the recomputed subsurface structure model onto the Lagrangian grid.

8. The computer readable program storage device of claim 7, wherein said steps of updating the subsurface structure model, increasing resolution of the Bernstein grid and recomputing the updated subsurface structure model, and mapping the recomputed subsurface structure model onto the Lagrangian grid are repeated while the Bernstein grid resolution is less or equal than the Lagrangian grid resolution.

9. The computer readable program storage device of claim 7, wherein updating the subsurface structure model by minimizing the data misfit between the plurality of observations and observations obtained by a simulation comprises:
   calculating a wave field as a function of time over a finite time interval by running a forward simulation;
   calculating an adjoint field as a function of time over the finite time interval by running a backward simulation based on the wave field;
   calculating a gradient of the misfit functional from the wave field and the adjoint field, and calculating the misfit from said gradient;
   estimating an updated subsurface structure model on the Bernstein grid that reduces the misfit functional itself; and
   mapping the updated subsurface structure model onto the Lagrangian grid.

10. The computer readable program storage device of claim 9, wherein said steps of calculating a wave field, calculating an adjoint field, calculating a gradient of the misfit functional and the misfit, estimating an updated subsurface structure model, and mapping the updated subsurface structure model onto the Lagrangian grid are repeated while a stop condition is not satisfied,
   wherein said stop condition is $|J(m_k) - J(m_{k-1})| < \text{Tolerance} \times J(m^*)$, wherein $m_k$ is a current estimate of the subsurface structure model, $m_{k-1}$ is a previous estimate of the subsurface structure model, $J(\ )$ is the misfit functional, $m^*$ is a subsurface structure model at a previous resolution of the Bernstein grid, and Tolerance changes on a case-by-case basis.

11. The computer readable program storage device of claim 7, further comprising repeating said steps of
   minimizing a data misfit of the plurality of observations with respect to an initial subsurface structure model, updating the subsurface structure model, increasing resolution of the Bernstein grid and recomputing the updated subsurface structure model on the increased resolution Bernstein grid; and mapping the recomputed subsurface structure model onto the Lagrangian grid for different initial subsurface structure models, and selecting a subsurface structure model that yields a smallest misfit functional as a best subsurface structure model.

12. The computer readable program storage device of claim 9, wherein:
   the initial subsurface structure model is defined as $m = \Sigma_i a_i B_i(x)$ wherein $B_i$ is an i-th Bernstein polynomial defined over the standard element $x \in [0,1]^3$ and extended to the entire Bernstein grid by continuity, and $a_i$, are constants wherein $a_i \geq 0$;
   wherein calculating a wave field as a function of time over a finite time interval by running a forward simulation solves $M(m)\ddot{u} + F(m, u) = s$ for a wherein u is the wave field, m is the subsurface structure model defined for points from all Bernstein polynomials in the Bernstein grid, M is a mass matrix, s is seismic source modeled as a point source, $F(m, u)$ is a force wherein $F(m, u) = K(m) u$ where K is a stiffness matrix;
   calculating an adjoint field as a function of time over the finite time interval by running a backward simulation based on the wave field solves $\ddot{a}^T M + a^T K = \partial_u r$ for a wherein a is the adjoint field, $a(T) = \dot{a}(T) = 0$, u is the wave field, $r(u, m, t) := \|d(t) - V u(m, t)\|^2$, $r(x) > 0$ for $x \neq 0$, is a noise model that quantifies the error between the plurality of observations $d(t)$ and the wave field $u(m, t)$ at locations of the plurality of sensors and V is a sampling matrix;
   the misfit functional is $J(u,m) = \Sigma_s^{Nsources} \int_0^T r(u, m, t) dt$;
   the gradient of the misfit functional is $\partial_m J = \Sigma_s^{Nsources} \int_0^T \dot{\beta}\, dt$ where $\dot{\beta} = (\ddot{a}^T \partial_m M + a^T \partial_m K)u + \partial_m r$, s.t. $\beta(0) = 0$, and $\partial_m K = (K(B_1), \ldots, K(B_n))$ are sensitivity matrices.

* * * * *